United States Patent [19]

Arnston et al.

[11] 4,128,005
[45] Dec. 5, 1978

[54] AUTOMATED ENGINE COMPONENT DIAGNOSTIC TECHNIQUES

[75] Inventors: Robert W. Arnston, Schaumburg; Gerald C. Trussell, Park Ridge, both of Ill.; Leo G. Rich, Rochester, Mich.

[73] Assignee: Sun Electric Corporation, Chicago, Ill.

[21] Appl. No.: 807,186

[22] Filed: Jun. 16, 1977

[51] Int. Cl.² ............................................. G01M 15/00
[52] U.S. Cl. ................................... 73/117.3; 364/431
[58] Field of Search ...................... 73/117.3, 116, 117; 365/424, 431

[56] References Cited
U.S. PATENT DOCUMENTS

3,630,076  12/1971  Staudt ................................. 73/117.3
3,683,683  8/1972  Demidov et al. ............... 73/117.3 X

Primary Examiner—Jerry W. Myracle
Attorney, Agent, or Firm—Allegretti, Newitt, Witcoff & McAndrews

[57] ABSTRACT

An apparatus for diagnosing the operating state or condition of various components of an automotive engine is disclosed herein. The apparatus generates diagnostic signals representing the relationship between engine operating parameters and engine specifications. The diagnostic signals are selectively processed according to a test matrix to determine the operating state of each engine component. A diagnostic message then identifies which, if any, of the components requires repair or replacement.

12 Claims, 7 Drawing Figures

INTERNAL COMPUTER MEMORY REPRESENTATION
ENGINE PARAMETER LIMIT VALUES

FIG. 4

TYPICAL INTERNAL COMPUTER MEMORY REPRESENTATION
ENGINE PARAMETER VALUE

AUTOMATED ENGINE COMPONENT DIAGNOSTIC TECHNIQUES

BACKGROUND OF THE INVENTION

The present invention relates generally to a system for diagnosing an internal combustion engine, gasoline or diesel. More particularly, the present invention relates to an engine diagnostic apparatus for determining the operating state of the engine components or areas and for producing a corrective message for the operator.

The servicing of automotive engines has become increasingly important as public awareness focuses more critically upon safety, oil and gasoline conservation and the effect of automotive emissions on the environment. Servicing has, however, become more and more difficult as automobile engines have become more sophisticated and intricate. This, in turn, substantially increases the cost of engine maintenance and repair.

Automotive test systems for display of engine operating parameters are well known. More sophisticated systems disclose whether an engine parameter is within an established engine specification.

Heretofore, the automotive mechanic interpreted the engine operational data in order to diagnose a faulty engine component. The data pertinent to a particular engine component is, however, accumulated through a series of individual measurements. Thus, the mechanic must recall previously measured data to perform the necessary interpretation and diagnosis. Errors are inherent in such a process and overall effectiveness depends primarily upon the experience and skill of the mechanic.

This problem is further emphasized as engines become more complex. That is, engine component diagnosis requires the consideration and interpretation of more and more operational data, placing an enormous burden upon the mechanic.

SUMMARY OF THE INVENTION

In a principal aspect, the present invention is an apparatus for testing internal combustion and diesel engines utilizing a diagnostic matrix. The apparatus provides visual maintenance and repair instruction in response to the diagnostic matrix.

Engine parameters are correlated with engine specifications to generate diagnostic signals, indicating whether the engine parameter is above, below or within the engine specification. The diagnostic signals are stored and subsequently evaluated under the diagnostic matrix.

The diagnostic matrix includes a series or plurality of tests for specific, predetermined engine areas or components. Within each test, various pertinent diagnostic signals are analyzed to determine the operational condition or state of the particular engine area. The maintenance or repair instruction is responsively generated, and identifies any component requiring attention.

It is thus an object of the present invention to provide an engine diagnostic system wherein faulty engine components are determined without operator interpretation of specific test readings. Another object is to provide an automated and rapid diagnostic device, substantially reducing the cost of automotive engine work.

It is a further object of the present invention to provide an automotive test apparatus including a visual display of diagnostic instructions indicating the proper repair procedures, including the identification of components requiring adjustment, repair or replacement. Still another object of the present invention is to provide a diagnostic matrix relating specific engine areas and measured parameters. Yet another object is to provide a diagnostic matrix using only logical "AND" and "OR" relationships.

An object of the present invention is also to provide an improved diagnostic apparatus where engine parametric measurements and conditions are stored in a form directly applicable to and recognized by a diagnostic matrix. A further object is to provide a readily modifiable diagnostic matrix for an engine analyzer.

These and other objects, features and advantages of the present invention are readily apparent from the following detailed description of a preferred embodiment.

BRIEF DESCRIPTION OF THE DRAWINGS

A preferred embodiment of the present invention is described, in detail, hereinafter with reference to the drawings wherein.

DESCRIPTION OF THE PREFERRED EMBODIMENT

Figure 1:
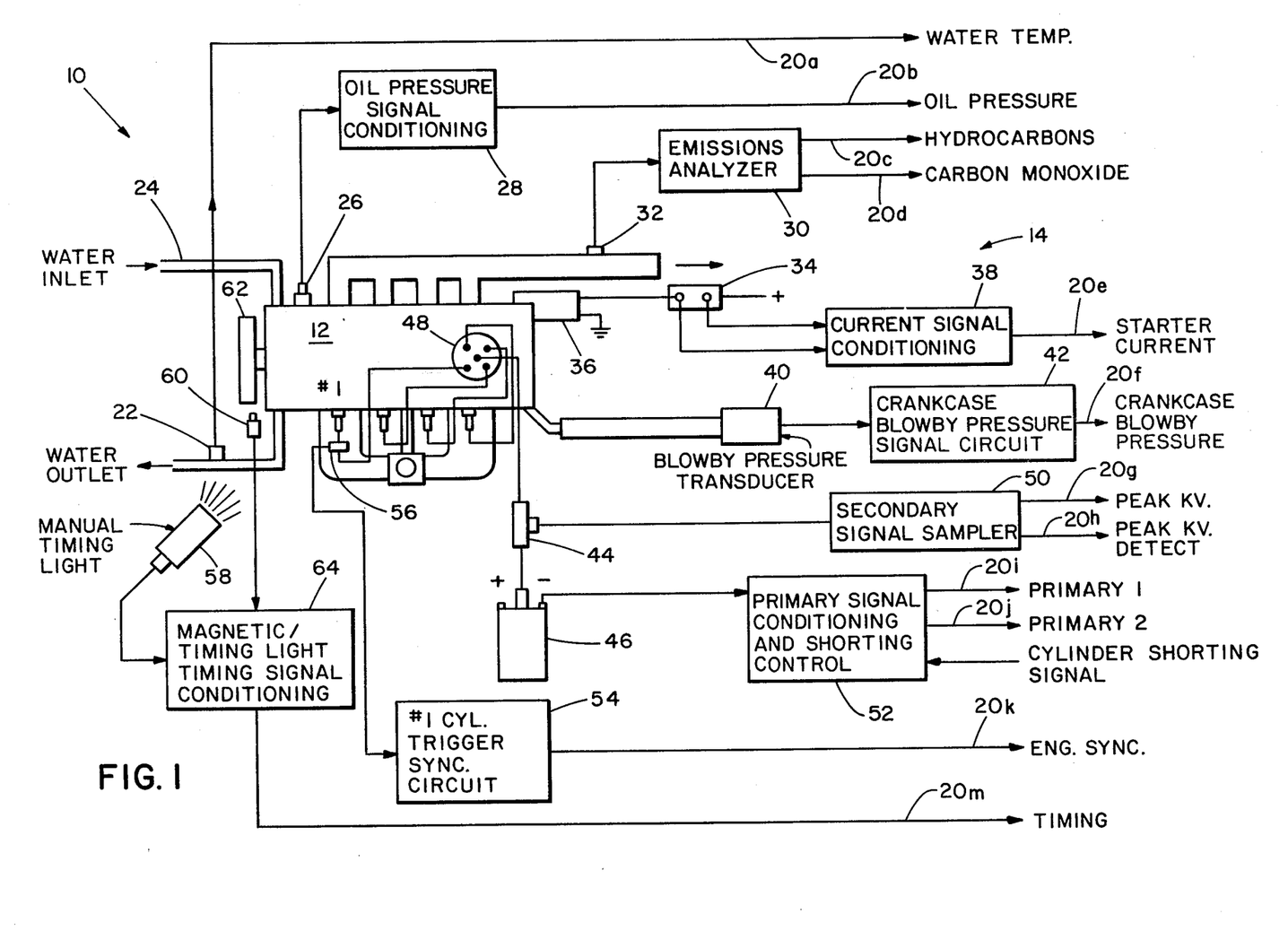
FIG. 1 is a diagrammatic representation of an engine parameter measurement system for use in conjunction with the present invention.
Figure 2:
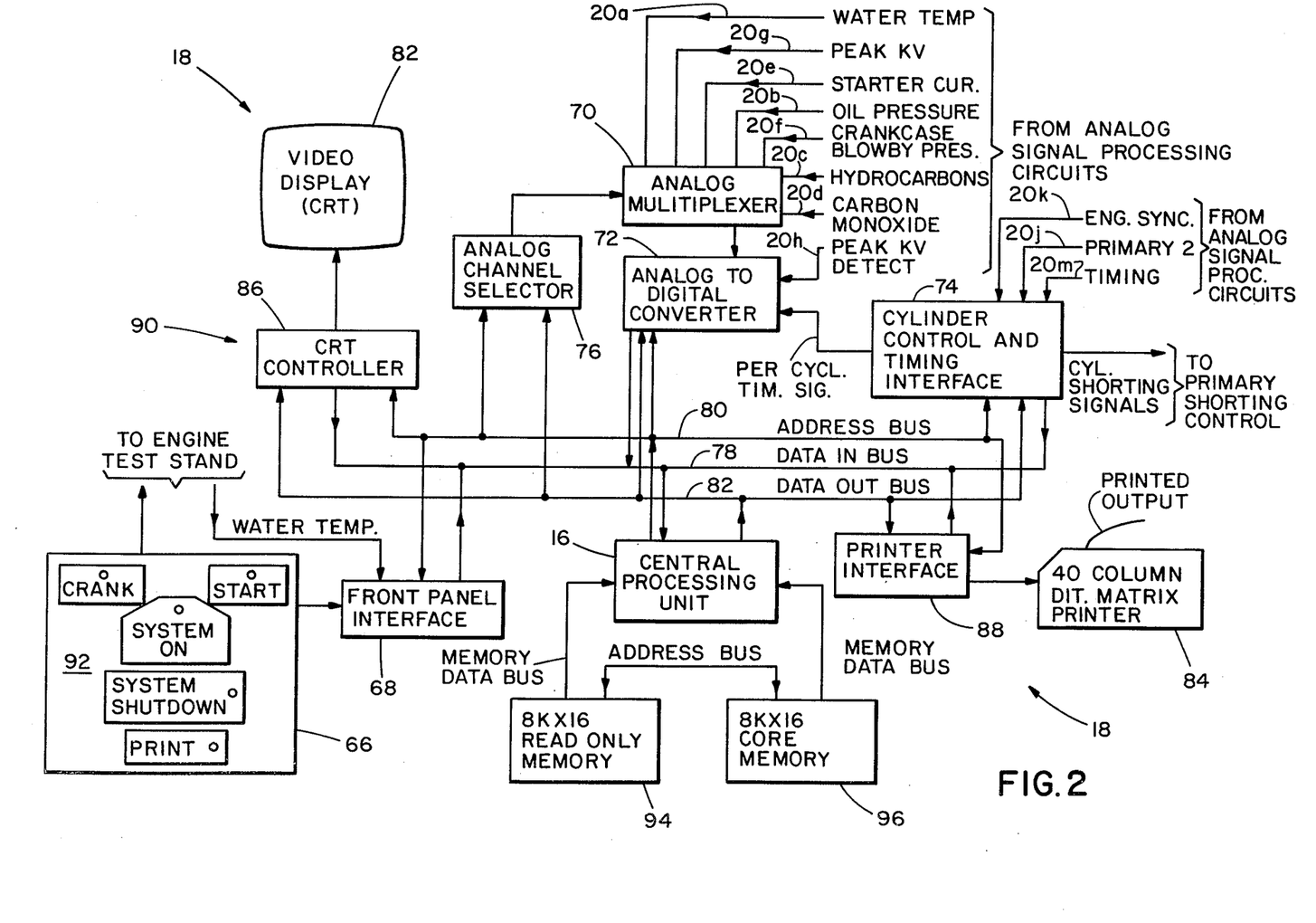
FIG. 2 is a block diagram of a preferred embodiment of the present invention.

Reference is initially made to U.S. patent application Ser. No. 641,362, now abandoned, entitled ENGINE TEST AND DISPLAY APPARATUS, filed Dec. 16, 1975 and assigned to the assignee of the present application. The teachings of application Ser. No. 641,362 and particularly those teachings pertinent to the features shown in FIGS. 1 and 2 are incorporated herein by reference. U.S. patent application Ser. No. 641,362 is the subject of a continuation application Ser. No. 798,181, filed May 8, 1977.

Figure 3A:
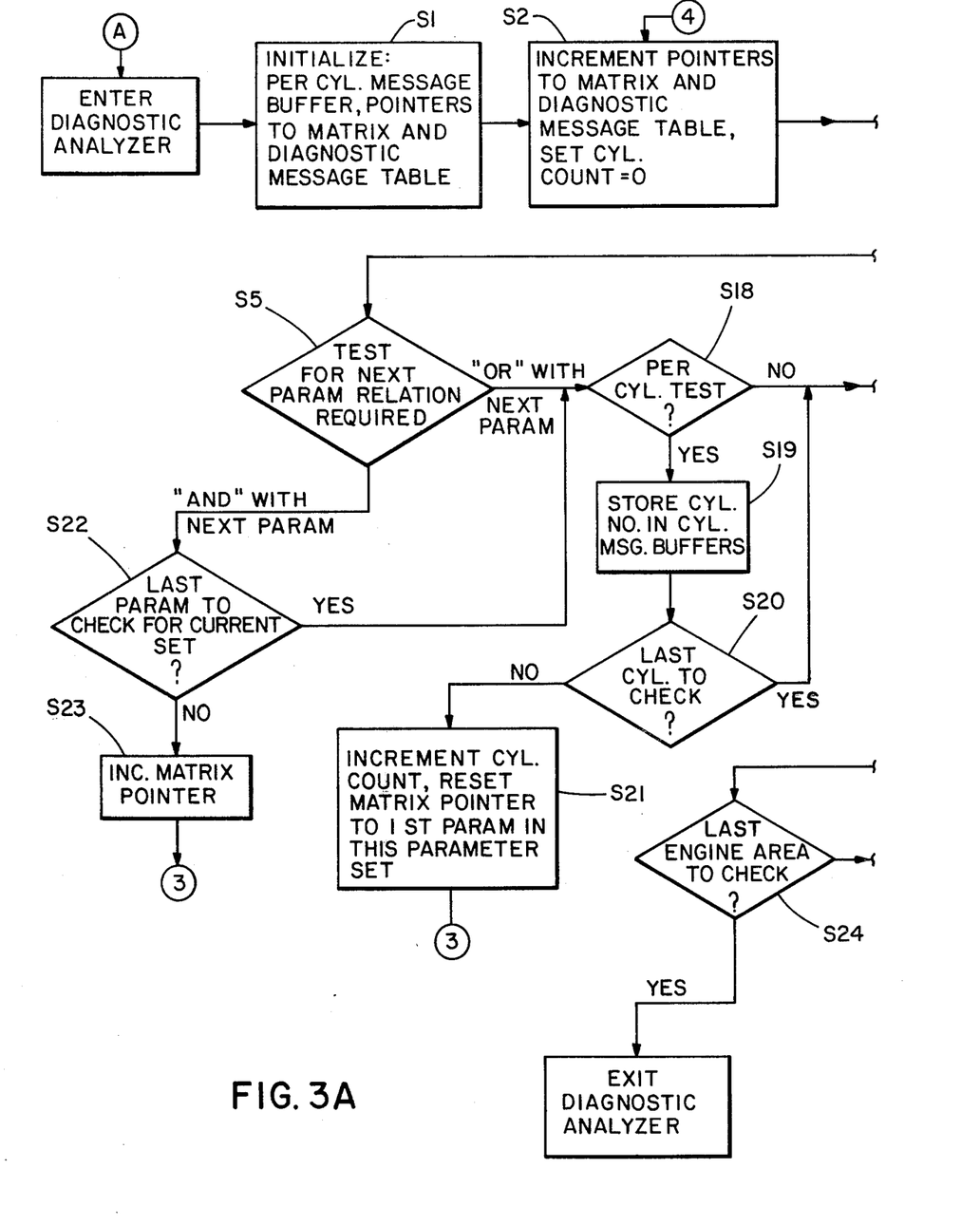
FIGS. 3A and 3B are flowcharts for the preferred embodiment of FIG. 2 illustrating the operation thereof.
Figure 3B:
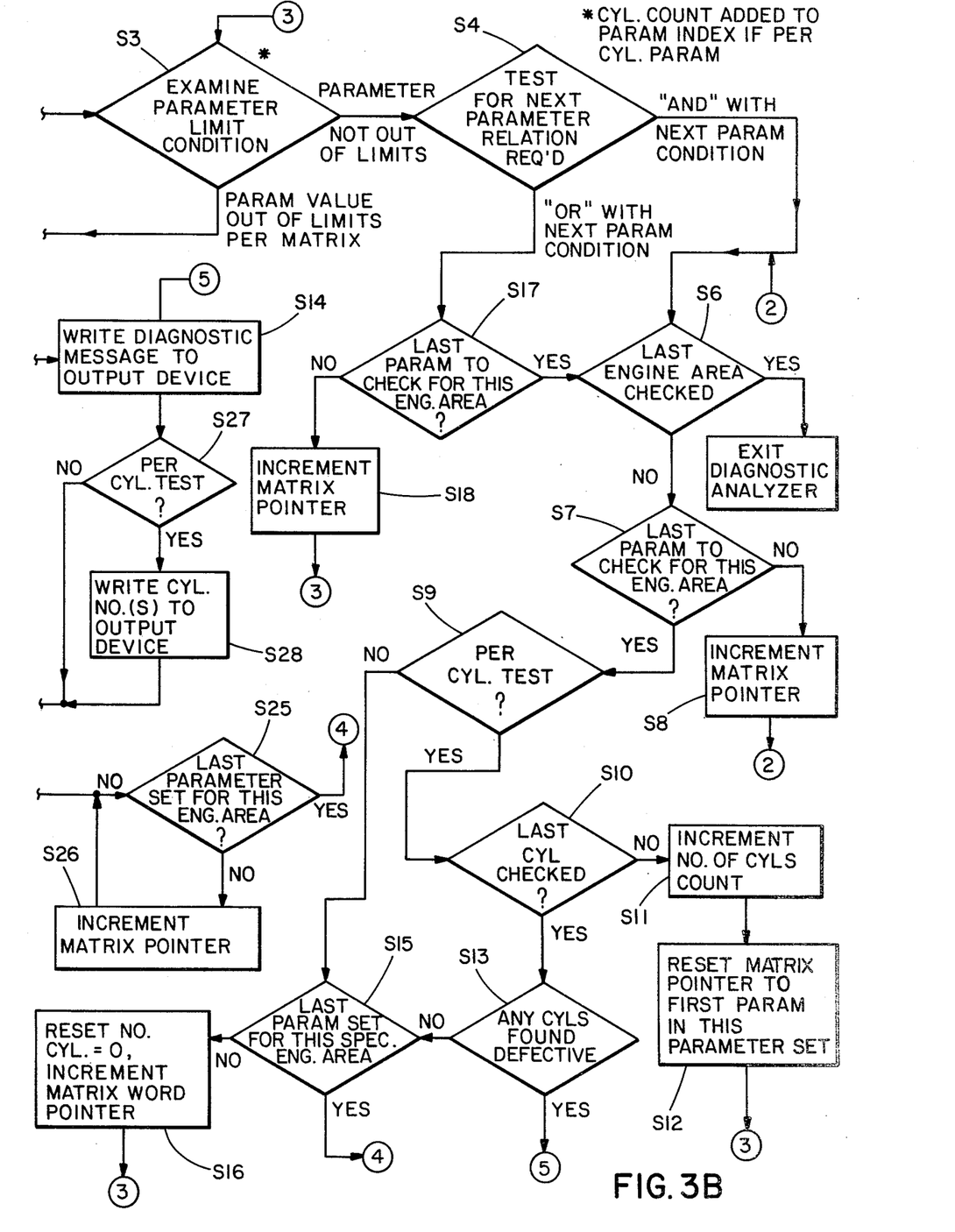

With reference to FIGS. 1-3, the present invention is shown as an apparatus, generally designated 10, for diagnosing the engine areas or components of an engine 12. The engine 12 is an internal combustion gasoline engine, but it is to be understood that the engine diagnostic apparatus 10 can be modified to test a diesel engine.

The engine diagnostic apparatus 10 primarily includes input means, generally designated 14, a central processing unit 16 and display means, generally designated 18. The input means 14 (FIG. 1) provides input signals representative of various engine parameters. The features and operation of the input means 14 is fully described and shown in FIGS. 1 and 2 and the incorporated teachings of Ser. No. 641,362; however, a brief description is provided herein to facilitate an understanding of the features and operation of the engine diagnostic apparatus 1.

In this preferred embodiment, the input means 14 is coupled to the engine 12 and provides voltage signals representative of or proportional to water temperature, oil pressure, exhaust hydrocarbons and carbon monoxide, starter current, crankcase blowby pressure, peak firing voltage (PEAK KV), a timing signal (PEAK KV DETECT) indicating when the peak firing voltage of a selected cylinder has been measured, primary coil voltage (PRIMARY 1 and 2), the firing of the number one cylinder (ENG SYNC) and engine timing. These input signals are either inputted directly to the processing unit 16 or manipulated prior to input.

More particularly, the input means 14 produces a WATER TEMPERATURE signal 20a by means of a water temperature switch 22 mounted on the water cooling system 24. The signal 20a is a HIGH/LOW signal depending upon the water temperature in relation to a temperature set point of the temperature switch 22. Oil pressure is sensed by an oil transducer 26 on engine 12, and the signal produced initially is processed by a conditioning circuit 28 to provide the OIL PRESSURE signal 20b.

The HYDROCARBONS and CARBON MONOXIDE input signals 20c, 20d are produced by an emissions analyzer 30 through an exhaust tap 32. In this preferred embodiment, the analyzer 30 is a non-dispersive infrared type analyzer.

A current shunt 34 coupled to the starter motor 36 and a second conditioning circuit 38 produce the STARTER CURRENT input signal 20e. The signal 20e is proportional to the DC current drawn by the starter motor 36 during cranking. A CRANKCASE BLOWBY PRESSURE signal 20f is generated by a blowby transducer 40 and is conditioned by a third conditioning circuit 42.

The PEAK KV signal 20g is produced by an in-line secondary pick-up 44, interconnecting the ignition coil 46 and distributor 48 of the engine 12, and a sampling circuit 50. The sampling circuit 50 is a sample/hold type. The PEAK KV DETECT signal 20h is also derived from the secondary signal sampling circuit 50.

The PRIMARY 1 INPUT signal 20i is a filtered image signal of the primary waveform. A conditioning and shorting control circuit 52, connected to the ignition coil 46, provides appropriate filtering. The PRIMARY 2 INPUT signal 20j is a filtered image waveform of the ignition system primary waveform used principally for measurement of engine dwell. The signal 20j, a square wave, also provides synchronization of the processing unit 16 for per cylinder measurements.

The ENG SYNC input signal 20k is produced by a trigger circuit 54 responsive to the firing of the number one cylinder spark plug. The trigger circuit 54 is coupled to the spark plug through a clamp-on inductive pick-up 56. The input signal 20k is utilized to measure engine speed and crankshaft timing.

The TIMING INPUT signal 20m is a digital pulse signal occurring before or after the ENG SYNC signal 20k. The TIMING signal 20m is derived from a manually operated timing light 58 or a magnetic transducer 60 positioned near the flywheel 62 of the engine 12, interconnected to a fourth conditioning circuit 64. The timing signal 20m indicates the relationship between the firing of the number one spark plug and the position of the number one piston at firing (normally measured in degrees of engine revolution).

The input means 14 also includes an initiator means 66 (FIG. 2) for initiating the data collection process, a front panel interface 68, an analog multiplexer 70, an analog-to-digital converter 72, a cylinder control and timing interface 74 and an analog channel selector 76, interconnected as shown. The processing unit 16 treats the devices 68–76 as peripheral devices for providing the unit with a plurality of digital parametric signals representing operating parameters of the engine 12.

That is, one of the input signals, WATER TEMPERATURE, is received directly by processing unit 16; others are received after digitization; and others are manipulated and then digitized for input to processing unit 16. In this preferred embodiment, the inputted digital parametric signals represent engine cranking speed, engine running speed, power balance speed change for each cylinder, engine dwell, engine running timing, oil pressure, ignition secondary voltage, dynamic points closed voltage, crankcase blowby pressure, exhausted hydrocarbons and carbon monoxide, water temperature, total engine relative compression, relative compression for each cylinder and cranking current. The parametric signals are received by processing unit 16 through a data-in bus 78.

More particularly, unit 16 issues cylinder selection commands to the interface 74 via an address bus 80 and data-out bus 82. The interface 74 responsively provides cylinder shorting signals to the conditioning and shorting circuit 52, such that per cylinder measurements can be made.

Processing unit 16 also issues channel selection and conversion commands to selector 76 and converter 72, respectively, via the address and data-out buses 80, 82. The digital parametric signals are resultingly available to and read by unit 16 on the data-in bus 78.

The display means 18 of the apparatus 10 includes a cathode ray tube (CRT) 82 and a printer 84. The CRT 82 and printer 84 are connected to processing unit 16 through a CRT controller 86 and printer interface 88, respectively.

In this preferred embodiment, the data collection process is initiated by depression of buttons on a front panel 92 of the initiator means 66.

Prior to the use of the initiator means 66, the operator makes the necessary connections to engine 12. Additional buttons crank and start engine 12, shut down the apparatus 10 and start printer 84. A keyboard (not shown) permits the operator to communicate with the processing unit 16.

Under appropriately displayed instructions, the operator conducts a specified sequence of tests wherein engine 12 is evaluated under cranking, idle, low cruise, snap acceleration and high cruise conditions.

Processing unit 16 cooperates with a read only memory 94, and a random access memory 96. The engine specifications stored in memory 94 are displayed on the CRT 82. The specifications correspond to the digitized parametric signals inputted to the processing unit 16.

Processing unit 16 is preferably a microprocessor, presently manufactured and sold by National Semiconductor, as Model IMP-16. Unit 16, when properly programmed, compares the digitized parametric signals with the stored specifications to determine whether the parametric signals represents a condition within, above or below specifications for the engine under test. A diagnostic signal, representing the relationship between the parametric signal and specification then is stored in memory 96. The comparison performed by unit 16 is operative until all parametric signals have been analyzed.

After all diagnostic signals have been stored, processing unit 16 analyzes the diagnostic signals to determine the operating state of predetermined engine areas or components by means of a diagnostic matrix. That is, unit 16 performs a plurality of tests corresponding respectively to engine components, and within each test, the pertinent diagnostic signals are analyzed.

For this preferred embodiment of the apparatus 10, the diagnostic matrix is shown in TABLE 1.

function operation for indicating the logical relation of its associated parameter requirement with the next parametric requirement specified directly below it within its same column. In general, all conditions specified within a column must be met in order for the column's associated engine component to be diagnosed as defective or faulty. Blank blocks within the matrix indicate that the associated measured parameter is irrelevant to a proper diagnosis of the associated engine area.

TABLE I
Engine Diagnostic Matrix

| Parameter Required For Diagnosis of Specified Engine Area or Component | Cylinder Head Cyl.X | Piston Ring Cyl.X | Spark Plug or Wire Cyl.X | Distributor (Electrical) | Distributor (Mechanical) OR | OR | Carburetor | Starter Motor | Oil Pump | Oil Passages |
|---|---|---|---|---|---|---|---|---|---|---|
| Cranking Speed | | | | | | | | LO AND | | |
| Running Speed | | | | | LO AND | HI/LO AND | LO OR | | | |
| Power Balance Speed Change | LO AND | LO AND | LO AND | | | | | | | |
| Cyl.X Dwell | | | | HI/LO OR | HI/LO | | | | | |
| Running Timing | | | | | HI/LO | HI/LO | | | | |
| Oil Pressure | | | | | | | | | LO AND | HI AND |
| Ignition Secondary KV | | | HI/LO AND | | | | | | | |
| Dynamic Points Closed Voltage | | | | HI | | | | | | |
| Crankcase Blow By | | HI AND | | | | | | | | |
| HC | HI AND | HI AND | HI | | | | HI OR | | | |
| CO | | | | | | | HI | | | |
| Water Temp. | | | | | | | | | >180° F | >180° F |
| Total Rel. Comp. | | | | | | | | LO AND | | |
| Rel. Comp. Cyl.X | LO | LO | | | | | | | | |
| Cranking Current | | | | | | | | HI | | |

The tests performed are listed in the columns to the right of the "parameter required" column. The pertinent diagnostic signals are shown in each column. For example, to diagnose a faulty oil pump, the diagnostic signals for oil pressure and water temperature must be examined; further, oil pressure must be low and water temperature must exceed 180° F.

Responsive to the diagnostic matrix, processing unit 16 generates an instruction signal to the display means 18. The instruction signal corresponds to the maintenance or repair work necessary to cure the out-of-specification conditions found by the processing unit. The instruction signal is visually displayed on the CRT 82 and/or printer 84. With reference to the oil pump example, if the oil pressure was low and the water pressure above 180°, then the displayed diagnostic instruction is "DEFECTIVE AREAS OIL PUMP."

Within the diagnostic matrix are disposed parametric requirements and relations necessary for diagnosing a specific engine component as faulty. These parametric requirements are indicated by the LO, HI, HI/LO indicia placed in TABLE I. A LO or HI requirement of a parameter indicates that the parameter should necessarily be found to operate below or above, respectively, its normal specification operating level in order to indicate that its associated engine component is faulty. A HI/LO requirement indicates that the parameter may be either above or below specification operation level to indicate faultiness.

Each particular matrix location containing a LO, HI or HI/LO requirement may also contain a boolean function operation for indicating the logical relation of its associated parameter requirement with the next parametric requirement specified directly below it within its same column.

To further illustrate the use of the matrix of TABLE I, the following parametric out-of-specification conditions and relations must be satisfied in order to specify that spark plug number 4 is defective: power balance speed change for cylinder no. 4 must be LO AND ignition secondary KV must be HI/LO AND hydrocarbons must be HI. As illustrated by this example, the boolean function AND links the parameter out-of-specification conditions which must conjointly occur for a particular engine component to be diagnosed as faulty. As illustrated by the "carburetor" column of TABLE I, if only one of a plurality of out-of-specification conditions need occur to find a particular engine component faulty, those conditions are linked by the boolean function OR. In either case, only a single boolean function is required in order to determine the state of a component. This is an important feature which simplifies design of the diagnostic matrix and increases its flexibility (e.g., the scope of the matrix can easily be expanded or contracted).

Figure 4:
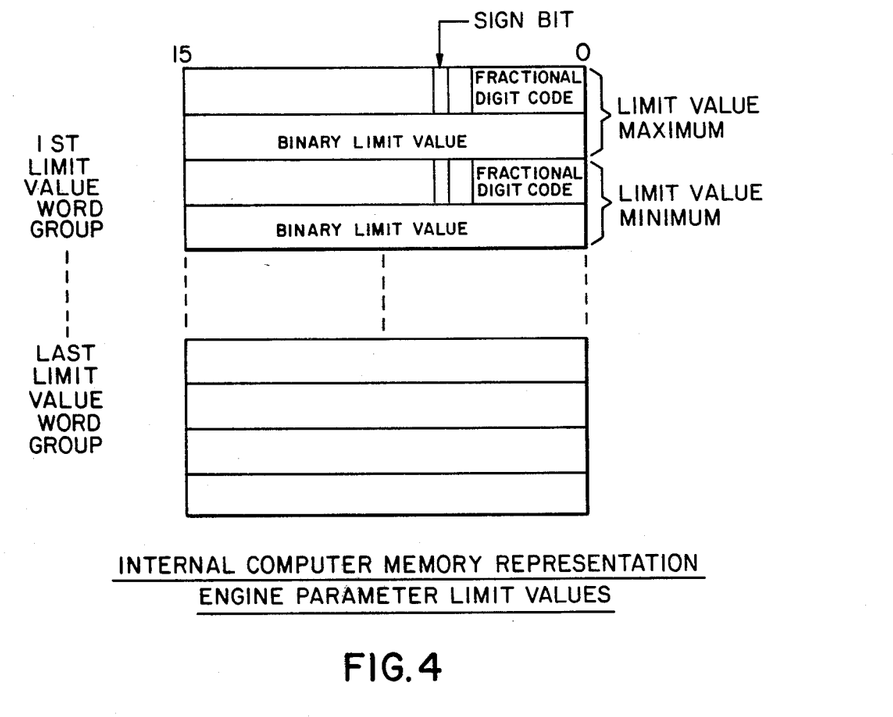
FIG. 4 is a schematic illustration of a preferred format of an engine parameter limit value word stored in a memory shown in FIG. 2.

As shown in FIG. 4, memory 94 includes a memory location for storage of the normal operating specifications of the engine operating parameters which head the rows of the diagnostic matrix (TABLE I). Each parameter specification is coded in memory as two pairs of 16 bit words. One of the pairs defines the maximum specification limit of the engine parameter while the other of the pairs defines the engine parameter's minimum specification limit. One of the words of each pair is the binary code for the decimal value of the specification limit, and the other word of the pair includes a fractional digit code and a sign bit code for use during reconstruction of the parameter specification in decimal form.

Figure 5:
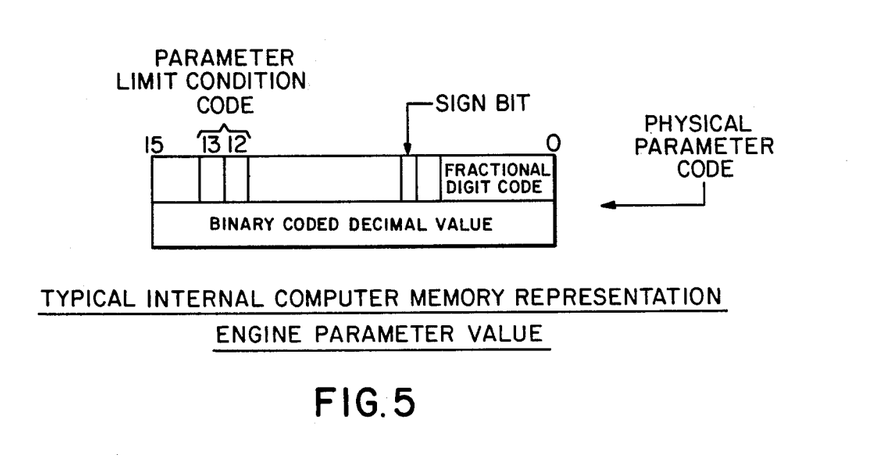
FIG. 5 is a schematic illustration of a preferred format of an engine parameter value word, including diagnostic signals, stored in a memory shown in FIG. 2.

As shown in FIG. 5, each of the actual measured parameters stored in the memory 96 is also coded as a single pair of 16 bit words. The second word of each pair defines the binary code for the decimal value of the measured parameter, and the first word of the pair includes a fractional digit code and sign bit code for proper reconstruction of the measured parameter in decimal form.

Central processing unit 16 performs a comparison operation on the stored measured parameters comparing the same with their respective specificational limit values also stored in memory. The comparison determines whether a parameter is above, within or below its normal operating specifications. The result of the comparison is coded in bits 12 and 13 of the first word of each measured parameter coded word pair as a diagnostic signal. The bits 12, 13 will be referred to as the parameter limit condition.

Where the parameter is found to be above its specificational range, bits 13 and 12 are coded 0, 1, respectively; where the parameter is found to be below its specificational range, the bits 13, 12 are coded 1, 0, respectively; and where the parameter limit condition is found to be within specifications, the bits 13, 12 are coded 0, 0, respectively.

Each parameter limit condition is assigned a physical parameter code which is used for address location determination of the parameter limit condition code within memory. A contiguous block of memory is assigned to contain all the measured parameters, and the physical parameter codes are consecutively ordered for use as index values to address the measured engine parameters for purposes of limit comparison and execution of matrix diagnostic instructions after the parameter limit conditions are generated.

Thus, the computer system contains a memory location having a stored parameter limit condition associated with each measured parameter of the engine and addressable according to the particular parameter. Each parameter limit condition code indicates that its respective parameter operating condition is either above, below or within its normal operating specifications.

Referring again to TABLE I, the engine diagnostic matrix reflects the order and sequence of an actual diagnostic matrix which is stored in memory 94. A contiguous block of memory is reserved to contain a plurality of matrix definer words, each of which represent a row-column intersection point of the diagnostic matrix of TABLE I.

Figure 6:
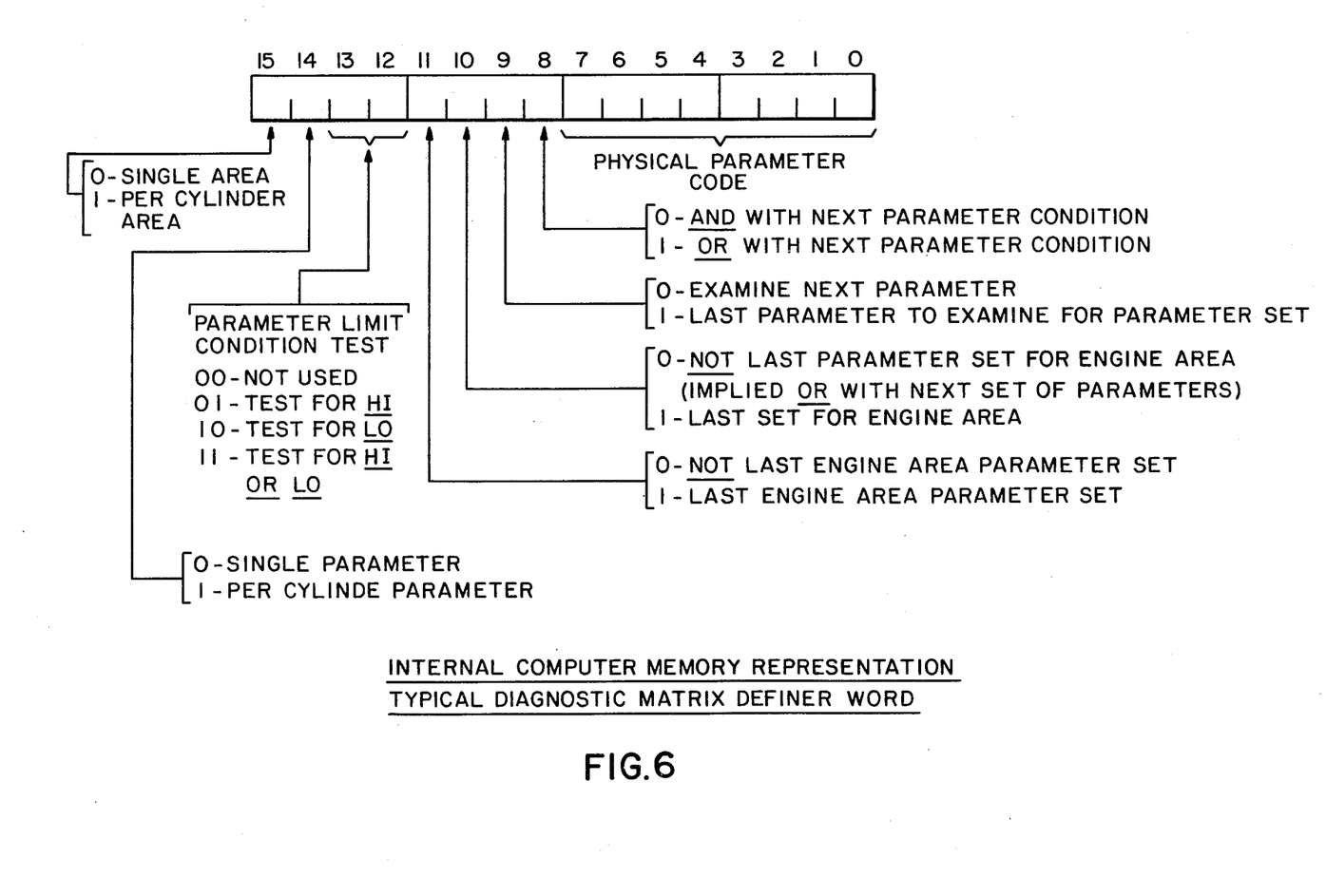
FIG. 6 is a schematic illustration of a preferred format of a diagnostic matrix definer word stored in a memory shown in FIG. 2.

As shown in FIG. 6, each matrix definer word is comprised of 16 bits. Bits 0-7 contain the physical parameter code corresponding to the parameter value word pair as shown in FIG. 5. Thus, bits 0-7 may be utilized to address the parameter limit condition of the definer word's associated parameter for retrieving a high or low operating condition of that parameter.

Bits 12 and 13 of the matrix definer word 39 are utilized to construct a parameter limit condition test to indicate whether the definer word of the diagnostic matrix requires an above or below or above/below operating parameter condition for indicating faulty operation of the definer word's associated engine component. The bits 12 and 13 of the definer word are set at 0, 1 for indicating an above specification requirement for the definer word's associated parameter; bits 13 and 12 are coded 1, 0 for a corresponding test for a below-specification requirement; and bits 13 and 12 are coded 1, 1 for a corresponding test of an either above or below-specification requirement for the definer word's respective parameter operating condition.

The remaining bits 8-11 and 14 and 15 of the definer words are utilized for controlling the functional diagnostic analysis of the parameter operating conditions as described hereafter.

The central processing unit (CPU) 16 is a 16-bit, parallel bus microprocessor having a microinstruction set implemented in a control read-only memory within CPU 16 for interpretation and execution of macrolevel assembly language instructions stored in memory 94.

The CPU 16 manages the acquisition of analog and digital data from the engine 12, compares computed parameter data with the individual parameter's stored specifications, generated diagnostic data signals indicating the parameter limit condition, stores the diagnostic data signals in memory (in the engine parameter value words), processes the data signals in conjunction with the diagnostic matrix (TABLE I), and displays diagnostic instruction messages in alphanumeric and/or graphical form on CRT 82.

To analyze the actual parameter values stored in the parameter value words (FIG. 5) according to the diagnostic matrix of TABLE I and to display diagnostic or instruction messages on CRT 82, the CPU steps through a control sequence schematically shown in the flowchart of FIGS. 3A, 3B.

The flowchart shown in FIGS. 3A, 3B, illustrates how the matrix definer words are processed in sequencing through the actual diagnostic matrix stored in memory 94. Generally, each decision block in FIGS. 3A, 3B is a test of the state of the associated bits in the matrix definer words. One "pointer" is assigned to reference which matrix definer word is being used, and another "pointer" is assigned to reference specific pre-defined messages stored in memory pertaining to the engine area under examination. A "cylinder number message buffer" is created for temporary storage of cylinder numbers found defective or faulty. The final output of the diagnostic analyzer is an engine area or component message and cylinder number(s) if appropriate. The message is written to a CRT monitor 82 and a dot matrix printer 84.

The encircled A in FIG. 3A indicates the initial entry point into the diagnostic mode of the system.

As shown in FIG. 3A, step S1 is the initialization step in which a per-cylinder message buffer is initialized and a matrix pointer and message table pointer are initialized. The matrix pointer is incrementable for successively addressing each matrix definer word stored in the memory 94. The message table pointer is associated with a diagnostic message table and is incrementable for successively addressing appropriate messages for CRT printer display.

In the preferred embodiment, only those definer words of each engine area, indicating the necessary requirements for problem diagnosis of that engine area are stored in memory. For example, for the cylinder head engine area, there will be three consecutively stored definer words, one associated with the power balance speed change parameter, one associated with the hydrocarbon parameter and one associated with the relative cylinder compression. Thus, the matrix pointer need only be incremented in the memory for movement to those required definer words of the cylinder head engine area diagnosis.

As will be obvious to those skilled in the art, the blank boxes of the diagnostic matrix may be represented by definer words in the memory 94 and the processing unit will accordingly test each definer word in memory to determine whether the definer word's associated parameter is required to be tested for an out-of-limit condition. When definer words are utilized to indicate blank positions in the matrix, the bits 12, 13 of the definer word may be coded 0, 0 to so indicate.

As shown in FIGS. 3A, 3B, step S2 increments the matrix pointer to transfer processing to the next successively stored definer word. The system continually enters step S2 after each definer word has been processed until the diagnostic matrix is completed.

After pointer incrementation, step S3 examines the parameter limit condition of the associated parameter of the definer word presently being processed. The examined parameter limit condition is compared with bits 12, 13 of the definer word for decision as to a corresponding match in required out-of-specification condition with actual out-of-specification condition. The results of the match decision transfer processing to either of steps S4 or S5.

A transfer to step S4 indicates a non-match decision of step S3. Step S4 accordingly begins a series of steps for determining the boolean functional relationship of the parameter requirements in the vertical matrix column presently being processed.

As illustrated in TABLE 1, all boolean functions coded in a single matrix column are like functions. Thus, where a determination is made that the first definer word of a matrix column is coded with an AND function and a step S3 decision of no match exists, then the engine area of the vertical matrix column being processed is a non-problem area. Where the engine area being diagnosed is a per cylinder diagnosis, then that engine area with respect to a particular cylinder is diagnosed as non-problematic.

Where step S4 indicates that the processed definer word is coded AND, then the matrix pointer is carried to the bottom of the vertical matrix column by a loop of steps S6, S7 and S8. Steps S6 and S7 check two particular bits in a definer word, e.g., bits 9 and 11, which are coded for indicating respectively whether the definer word is the last definer word in its vertical matrix column and whether the definer word is the last definer word in the matrix. Thus, after step S4 tests a definer word as coded AND, the processor merely tests bits 9 and 11 of the next successive definer words until bit 11 indicates that the matrix is completed or bit 9 indicates that the last definer word in the presently processed vertical column has been reached.

In order to condense the diagnostic matrix, and to provide matrix flexibility as to the number of cylinders of the engine being diagnosed, a single engine area relating to per cylinder diagnosis is repeatedly processed according to the number of cylinders in the tested engine. Accordingly, the last definer word in a vertical column is coded with a single bit, e.g., bit 15, for indicating that the processed matrix column must be reprocessed using parameter data of another cylinder.

Where step S7 indicates that the matrix pointer has reached the bottom of the vertical column, the processing is transferred to step S9 for determining whether bit 15 of the presently processed definer word indicates that the present engine area is a per cylinder area.

If step S9 indicates that a per cylinder area is being processed, the matrix pointer is transferred to the top of the vertical column according to the number of cylinders of the tested engine, by steps S10, S11 and S12. The steps S10, S11 and S12 increment a CYLINDER COUNT buffer and compare the value of the CYLINDER COUNT buffer with the number of cylinders of the tested engine, as provided by the operator.

When the last cylinder test of a vertical column is processed as non-faulty, the step S10 transfers processing to step S13 for examining whether any of the cylinders of the vertical column have been found to be defective. Where a prior cylinder test has diagnosed a cylinder as defective, step S13 transfers processing to step S14 which initiates a series of steps for display of appropriate diagnostic messages as described hereinafter.

Where step S9 indicates that the engine area under diagnosis is not a per cylinder area or where step S10 indicates that no cylinders of the engine area under diagnosis are defective, the matrix pointer is transferred to the top of the next vertical column of the matrix.

Normally, processing of the next vertical column will begin diagnosis of another engine area. However, in order to provide all like functional relationships in each vertical column for simplifying processing, an engine area may include more than one vertical column. That is to say, an engine area may have separate parameter sets, one of which will indicate that engine area as a problem area.

For example, referring to TABLE 1, the mechanical distributor area is comprised of three vertical columns in the diagnostic matrix. Whenever any one of those three columns results in a diagnosis of area faultiness, the distributor message is displayed to the operator as being faulty. Each vertical column in the distributor (mechanical) area is referred to as a parameter set.

Thus, before the matrix pointer is carried to the top of a succeeding column, a test is conducted to determine whether the presently processed column is the last or only column in the engine area. Accordingly, bit 11 of the definer words is coded to indicate whether the definer word's vertical column is the last engine area parameter set.

As shown by step S15, where bit 11 indicates that the presently processed column is a last parameter set, processing is transferred back to step S2 for incrementation of both the matrix pointer and the message table pointer. However, where the processed column is not the last parameter set, only the matrix pointer is incremented as shown by step S16.

Referring again to processing step S4, where step S4 indicates that the first processed definer word of the column is coded OR, then the matrix pointer is successively incremented for individually processing the remaining definer words of the column by a loop of steps S17, S18 and S3. When the pointer reaches the bottom of the vertical column and no definer words have found their respective parameters to be out-of-specification, step S17 transfers processing to step S6 for determining whether the matrix is completed, whether the column should be reprocessed with other cylinder data, and whether the next column to be processed is associated with the same engine area.

Referring again to processing step S3, where step S3 indicates that the required out-of-specification condition of the definer word matches with the actual out-of-specification condition of the definer word's associated parameter, processing is transferred to step S5. Step S5 begins a series of steps for determining the boolean functional relationship of the parameter requirements in the vertical column presently being processed. Since all functions within a matrix column are like functions, a determination by step S5 that the presently processed definer word is coded with an OR function will transfer processing to step S14 for displaying diagnostic messages indicating a faulty engine area or component.

However, prior to transfer form step S5 to S14, a test at step S18 is executed to determine whether the faulty engine area relates to a particular cylinder. If the area is a per cylinder area, than steps S19, S20 and S21 permit processing of all cylinders under that area before the diagnostic message is displayed by processing step S14.

Where a determination is made by step S5 that the presently processed definer word is coded with an AND function, then steps S22 and S23 increment the matrix pointer for individually processing the remaining definer words to check their matching of parameter limit conditions at step S3.

The processing of step S14 by the CPU 16 directs the printer 84 via printer interface 88 and CRT 82 via CRT controller 86 to print and display the data message indicated by the message table pointer. The printing and displaying of diagnostic messages occurs whenever a problem area is diagnosed by the CPU. The engine diagnosis messages can be divided into three basis groups:

1. Corrective Action
2. Conditional
3. Defective Area or Component

Examples of these three are:

| Corrective Action | Conditional | Defective Area or Component |
|---|---|---|
| Charge Battery | Excessive secondary resistance - cyl. No. 10 | Faulty voltage Regulator Shorted diode-alternator |
| Set Dwell | | |
| Set Timing | Contact point corrosion | Shorted condenser |
| | Fouled spark plug | Defective ignition module |
| | Compression leak Cyl. No. 4 | |
| | Rich fuel mixture | |

The basic definition of each type of diagnostic messages is: (1) Corrective action messages are instructions to the operator of the engine test system to take specific action to remedy a problem causing engine malfunction. (2) Conditional messages indicate out of limit or improper engine conditions causing malfunctions. The corrective action which could correct the problem is left up to the operator. Conditional messages act as "pointers" to specific engine components which require adjustment, cleaning, or replacement. (3) Defective area or component messages specifically pinpoint a faulty component which must be replaced or repaired to remedy an engine malfunction.

A typical message would have the form as shown below:

| ENGINE DIAGNOSTIC ANALYSIS DEFECTIVE AREAS: | |
|---|---|
| CYLINDER HEAD | CYL 1-3 |
| CARBURETOR | |
| STARTER MOTOR | |

Processing of the matrix thereafter is resumed between printings by processing steps S24, S25, and A26.

If a per cylinder area is displayed or printed, processing steps S27 and S28 transfer the appropriate cylinder numbers from the CYLINDER COUNT buffer for proper printing of cylinder numbers which are found defective.

It should be understood, of course, that the following disclosure relates to a preferred embodiment of the invention and that modifications or alterations may be made therein without departing from the spirit or scope of the invention as set forth in the appended claims.

This specification has referred to individual engine components and to engine "areas" which include pluralities of such components. As used in the appended claims, the term component refers to an assembly of such components (i.e., an area) as well as an individual component.

What is claimed is:

1. An apparatus for diagnosing an internal combustion engine including a plurality of engine components and a plurality of engine operating parameters, said engine having engine specifications for said engine operating parameters, comprising in combination:

input means for providing input signals representative of said engine operating parameters;

memory means for storing said engine specifications in the form of discrete coded data specifying a problem level associated with one or more of the operating parameters;

processor means for:
 (i) respectively comparing said input signals and said engine specifications;
 (ii) generating a plurality of diagnostic signals, each of said diagnostic signals representing the correlation between a said engine operating parameter and a said engine specification;
 (iii) selectively analyzing at least one of said diagnostic signals; and
 (iv) generating an instructional signal indicating an operating state of at least one of said engine components; and display means for visually displaying said instructional signal.

2. In an apparatus for analyzing an internal combustion engine of the type including input means coupled to said internal combustion engine for generating digital measurement signals corresponding to predetermined engine operating parameters and display means for displaying indicia representative of said predetermined engine operating parameters, said internal combustion engine having engine components, an improvement comprising:

memory means for storing in digital form the engine specifications of said predetermined engine operating parameters, each digital engine specification specifying a problem level associated with one or more of the operating parameters;

processor means cooperable with the input means and said memory means for:
 (i) comparing each digital measurement signal with a corresponding engine specification;
 (ii) generating a plurality of diagnostic signals, each said diagnostic signal representing the results of the comparison of a said digital measurement signal with the said corresponding engine specification;
 (iii) storing said diagnostic signals in said memory means;

(iv) selectively analyzing said diagnostic signals to determine the operating state of each engine component;

(v) generating an instructional signal indicating an operating state of at least one of said engine components; and means interconnecting said processor means and said display means for display of said instructional signal.

3. An engine diagnostic apparatus for diagnosing a particular engine in terms of certain of a plurality of engine parameters, comprising:

testing means cooperable with an internal combustion engine for representing a plurality of predetermined engine operating parameters;

memory means storing engine specifications of each of said plurality of engine parameters, and storing discrete coded data, each said coded data associated with a particular engine parameter and coded for specifying a problem level of said data's associated parameter's operating level;

data processor means for:
(i) comparing each said parameter with its respective engine specification;
(ii) generating a diagnostic signal representing the correlation between each said parameter and its respective engine specification;
(iii) storing said diagnostic signals in said memory means;
(iv) selectively correlating at least one said diagnostic signal with said coded data, said coded data indicating diagnostic signal requirements for a determination of the operating state of the engine component;
(v) generating an instructional signal indicative of said operating state of said engine component; and display means for visually displaying said instructional signal.

4. Apparatus according to claim 3 wherein said processor means correlates a said coded data's coded problem level with the said coded data's associated parameter's diagnostic signal.

5. Apparatus according to claim 3 wherein certain of said coded data is coded for indicating a boolean-function operation.

6. Apparatus according to claim 5 wherein said processor means functionally relates the correlation of said diagnostic signal and said coded data according to said indicated boolean function operation.

7. Apparatus for displaying an indentification of faulty components within a predetermined group of components of an internal combustion engine, characterized by measurable operating parameters comprising:

first memory means for storing specification signals defining the normal range of values of select parameters within a select group of said operating parameters;

input means for generating parameter signals representing current values of the select group of operating parameters in order to enable production of diagnostic signals, each diagnostic signal representing one or more discrete states defining the relationships between a select parameter signal and the normal range;

second memory means for storing a separate collection of matrix signals for each component in the predetermined group, each collection defining a combination of diagnostic signals which indicate that a component is faulty;

processor means for generating the diagnostic signals by comparing the parameter signals with the specification signals, for causing the diagnostic signals to be stored, for comparing the diagnostic signals with the matrix signals, and generating an instruction signal in the event that a collection of matrix signals defines a combination of the stored diagnostic signals; and display means for displaying each instruction signal, whereby each faulty component in the predetermined group is identified.

8. Apparatus, as claimed in claim 7, wherein the processor means comprises means for defining a first discrete state of a diagnostic signal representing an operating parameter having a value greater than the normal range, for defining a second discrete state of a diagnostic signal representing an operating parameter having a value less than the normal range, and for defining a third discrete state of a diagnostic signal representing an operating parameter having a value within the normal range.

9. Apparatus, as claimed in claim 8 wherein the processor means comprises means for storing at a predetermined address each diagnostic signal in the form of an engine parameter value word comprising one of said discrete states.

10. Apparatus, as claimed in claim 9 wherein the second memory means comprises means for storing in connection with each collection a plurality of digital matrix definer words, each said definer word representing a select parameter and comprising an index to said predetermined address and a parameter limit condition test code which defines the discrete state of a diagnostic signal tending to indicate that a component associated with the collection is faulty.

11. Apparatus, as claimed in claim 7, wherein the first memory means comprises means for storing each specification signal in the form of a pair of limit value words, the first word in each pair defining the maximum value of the normal range and the second word defining the minimum value of the normal range.

12. Apparatus, as claimed in claim 7, wherein the second memory means comprises means for storing the matrix signals so that each said combination of diagnostic signals is defined by means of a single boolean operator.

* * * * *